United States Patent

Yamashita

[15] 3,678,280

[45] July 18, 1972

[54] ELECTRO-OPTICAL CONVERTER USING A PULSE GENERATING DIODE TO GENERATE SIGNAL HAVING PULSE REPETITION FREQUENCY ACCORDING TO LIGHT SIGNAL

[72] Inventor: Sadahiko Yamashita, Kadoma City, Japan

[73] Assignee: Matsushita Electric Industrial Company, Limited, Kadoma City, Osaka, Japan

[22] Filed: Sept. 17, 1970

[21] Appl. No.: 73,051

[30] Foreign Application Priority Data

Sept. 20, 1969 Japan....................................44/74822
Sept. 20, 1969 Japan....................................44/75557

[52] U.S. Cl. ..................................250/213 A, 331/66, 332/3
[51] Int. Cl. .......................................H01j 31/50, H01j 39/12
[58] Field of Search.......................250/213 A, 211 R; 332/3; 331/66

[56] References Cited

UNITED STATES PATENTS 1,934,726 11/1933 McCreary..................................332/3
3,033,989 5/1962 Kazan..................................250/211 X

*Primary Examiner*—James W. Lawrence
*Assistant Examiner*—T. N. Grigsby
*Attorney*—John Lezdey

[57] ABSTRACT

An electro-optical converter comprising a first loop including in series a photoconductive element having a photoconductive body and a light permeable electrode mounted at one end of the body, a DC power source and a pulse generating diode, and a second loop including in series the pulse generating diode as a common element and an electroluminescent material having a light permeable electrode at one end thereof. The other ends of the photoconductive body and the electroluminescent material are made in electrical contact with each other. When the first loop oscillates with an input light signal being incident on the photoconductive body, the second loop is energized to emit an output light signal. The intensity of this light signal depends upon that of the incident light and upon the bias voltage applied to the pulse generating diode by the DC power source. The pulse generating diode employed in this converter is a novel one having a ν-N structure.

5 Claims, 11 Drawing Figures

INVENTOR
SADAHIKO YAMASHITA
BY John Lezdey
ATTORNEY

INVENTOR
SADAHIKO
BY
ATTORNEY

INVENTOR

BY John Lezdey

ATTORNEY

INVENTOR
SADAHIKO YAMASHITA
BY
ATTORNEY

ELECTRO-OPTICAL CONVERTER USING A PULSE GENERATING DIODE TO GENERATE SIGNAL HAVING PULSE REPETITION FREQUENCY ACCORDING TO LIGHT SIGNAL

This invention relates to an electro-optical converter utilizing a pulse generating diode a photoconductor and/or an electroluminescent element as elements thereof. More particularly, the invention relates to an electro-optical converter including an oscillatory circuit which is triggered by a light signal incident thereon.

It is an object of this invention to provide an improved electro-optical converter including an oscillatory circuit which is triggered by a light signal incident thereon.

Another object is to provide an improved oscillatory circuit employing a pulse generating diode and a photoconductor.

A further object is to provide a high frequency oscillatory circuit which produces a pulse train with or without its modulated frequency respectively in response to application thereto of a bias voltage higher or lower than the oscillation starting voltage of the diode.

A still further object is to provide a high frequency oscillatory circuit in which the pulse generating diode and the photoconductor are made intergral with each other as a single element.

A still another object is to provide an electro-optical converter in which the electroluminescent element is energized to luminesce by the oscillatory circuit.

A still another object is to provide an electro-optical device having a plurality of the electro-optical converters arranged in cascade in such a manner that one converter luminesces to emit a light signal which in turn triggers another converter.

Figure 5:
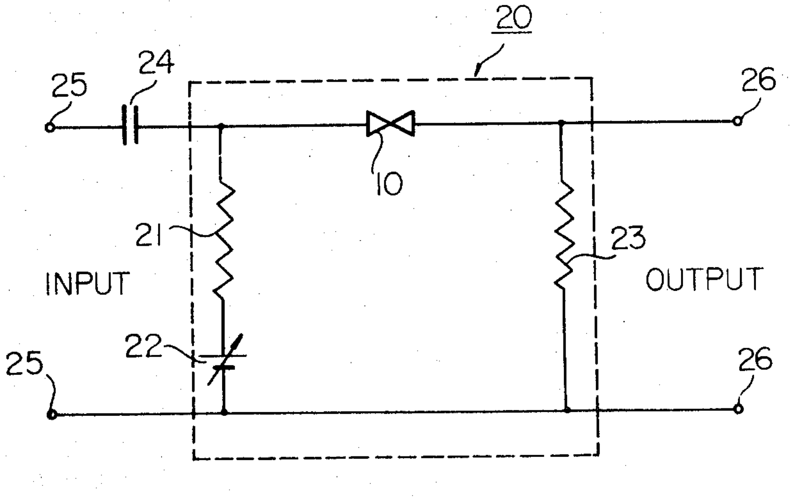
FIG. 5 is a basic circuit diagram including the pulse generating diode of FIG. 1.
Figure 6:
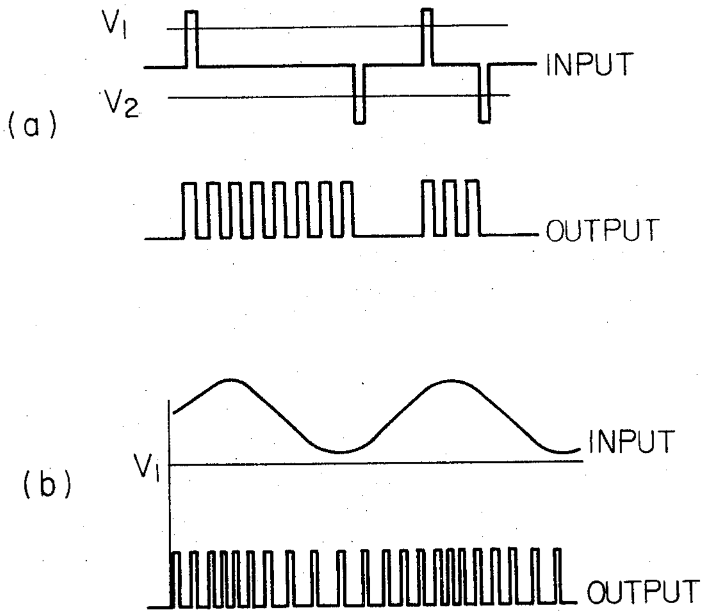
Figure 7:
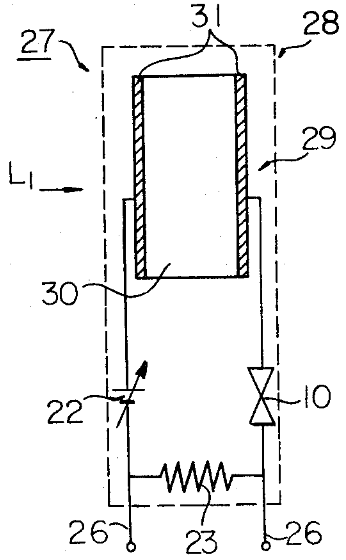
Figure 8:
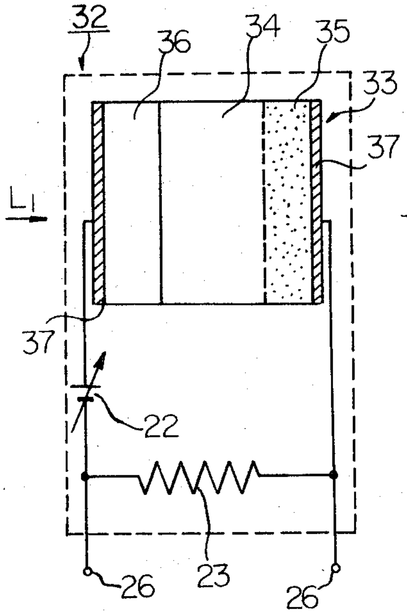
Figure 9:
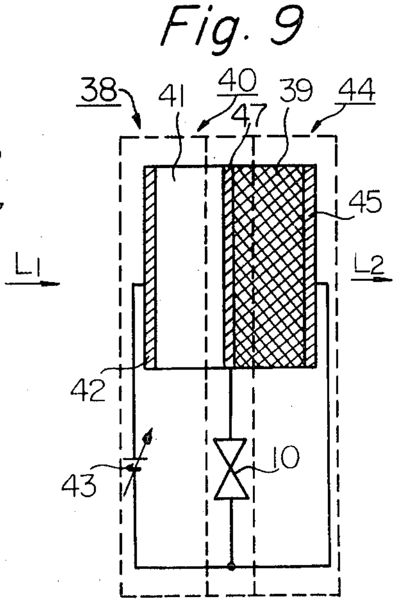

FIGS. 6*a* and 6*b* are illustrative views explaining the operations of the circuits shown in FIG. 5;

FIG. 7 schematically shows a high frequency oscillatory circuit of this invention;

FIG. 8 is similar to FIG. 7 but shows another oscillatory circuit of the invention;

FIG. 9 schematically shows an electro-optical converter of the invention; and

Figure 10:
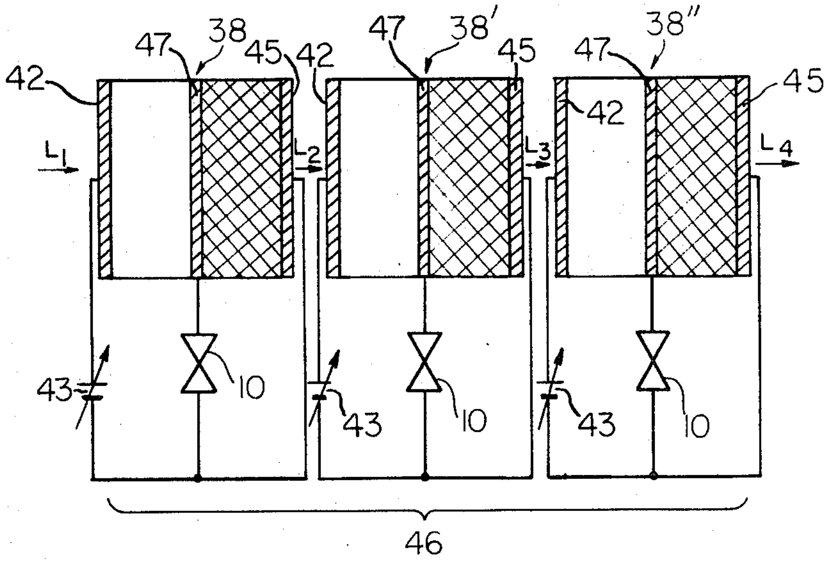

FIG. 10 schematically shows an electro-optical device of the invention.

Before describing more specifically the concept of this invention, it will be helpful to discuss the principle of the oscillation mechanism of the pulse generating diode.

Figure 1:
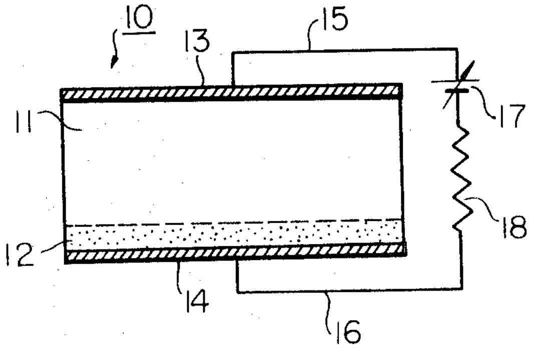
FIG. 1 is a schematic sectional view of a pulse generating diode employed in the present oscillator devices.

Referring to FIG. 1, the pulse generator 10 as applicable in this invention has a diode configuration and comprises a wafer 11 of a semiconductor material. The material of the wafer 11 may be gallium arsenide. The wafer 11 is, for example, of N-type and has a highly resistive layer 12 formed adjacent one of the two major surfaces thereof. Diffusion or crystal growth may be utilized to dope an impurity, locally lowering the conductivity of the wafer 11 to thereby form the highly resistive layer 12 of ν-type. The diode has thus a ν-N structure, and a similar characteristic is also available in the case of a symmetrical structure of ν-N- νtype. The impurity may comprise, for example, iron, nickel, copper, chromium, cobalt or manganese.

Deposited upon and in ohmic contact with both of the major surfaces of the wafer 11 are conducting electrodes 13 and 14 which may comprise tin alloy, eutectic mixture of gold and germanium and the like. Connections to these electrodes 13 and 14 are made by lead wires 15 and 16, respectively, which are connected across a power source 17 of variable d.c. voltage in series with a load resistance 18.

Figure 2:
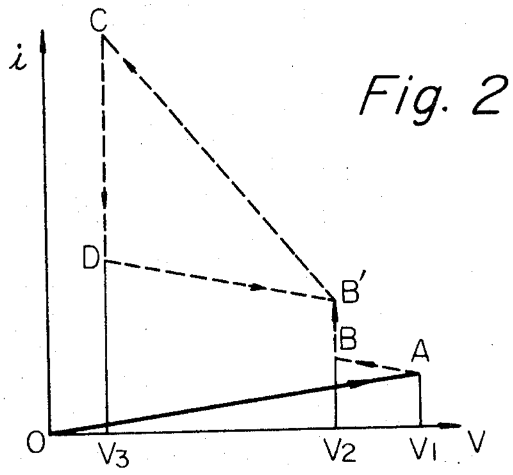
FIGS. 2, 3 and 4 are illustrative graphs explaining the principle of the oscillation mechanism achievable with the pulse generating diode of FIG. 1.

Turning now to FIG. 2, as a voltage V as applied across the wafer 11 is increased, the current *i* flowing therethrough slightly increases. When the voltage V exceeds the threshold value $V_1$, avalanche multiplication of carriers takes place in the highly resistive layer, causing the operating point to move from A to C through B and B'. The point C may be assumed to correspond to the conditions under which the highly resistive layer 12 is short-circuited. The operating point, then, moves to point D and back to point B'. It should be noted that this cycle repeats itself along the locus B'CD if the bias voltage V is above $V_2$. Therefore, the value $V_1$ may be called an oscillation starting voltage, while the value $V_2$ an oscillation terminating voltage.

As will be understood from the locus B'CD, this diode may switch between a high and low-current situation due to the effect of the avalanche multiplication and to the trapping effect in deep impurity centers.

Figure 3:
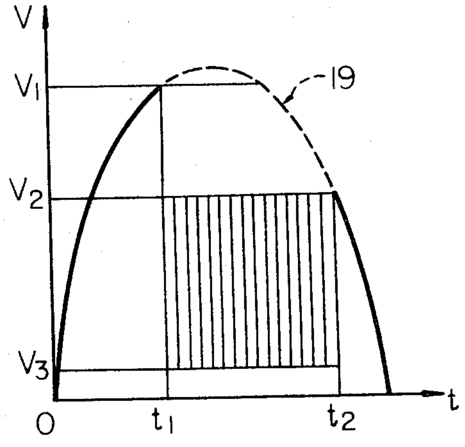

FIG. 3 is a plot of voltage V appearing across the diode 10 against time *t*, when the maginitude of the bias voltage Vb is sinusoidally changed during a half cycle. As shown, the voltage V increases with increasing bias voltage Vb. At the time $t_1$ when Vb reaches $V_1$, the diode 10 starts to oscillate, so that the voltage V cyclically varies between $V_2$ and $V_3$, as described in connection with FIG. 2.

However, as is shown by the dotted line 19 of FIG. 3, even if the bias voltage Vb is decreased below $V_1$the diode 10 does not cease to oscillate. For the diode 10 to cease oscillation it is necessary to lower the bias voltage Vb below $V_2$. It is to be understood, in this connection, that a hysterisis phonomenon can be observed in this pulse generating diode 10.

Figure 4:
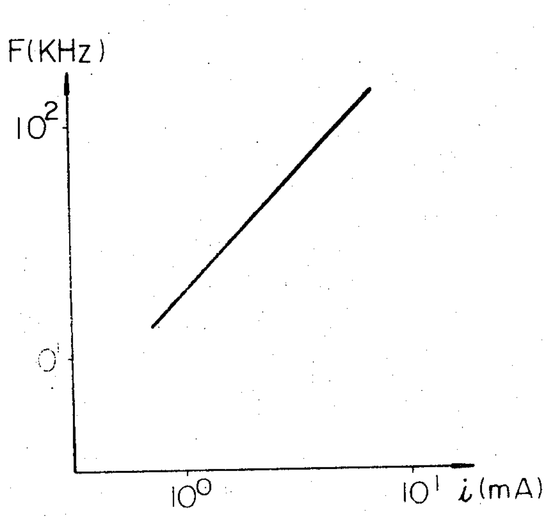

The relationship between the frequency F and the current *i* flowing through the pulse generating diode is obtained from my experiment and is shown in FIG. 4. The frequency of this diode depends substantially linearly upon the current flow in a selected operating region.

The diode may be characterized as follows. (1) The upper limit of the repetition rate is determined by the property of the diode itself, and the lower limit is reduced by increasing the RC time constant of the external circuit. (2) The pulse-repetition rate can be varied by a DC bias current of the order of 10. (3) A large output voltage of up to 50 volts (for a 50 ohm resistive load) is obtained with a pulse width of a few nanosecond.

FIG. 5 is a diagram of a basic circuit used in the electro-optical converter according to this invention. The circuit is shown to include an oscillatory loop 20 having connected in series with each other the pulse generating diode 10, a protective resistance 21, a power source 22 and a load impedance 23. The power source 22 is of variable DC voltage type having a bias voltage $Vb_1$. One terminal (not numbered) of the diode is connected through a capacitor 24 to one of imput terminals 25 while the other terminal (not numbered) to one of output terminals 26. It is to be noted in this circuit that a current wave is produced at the output terminals 26.

In the operation of the circuit shown in FIG. 5, the DC voltage source is assumed to be adjusted so that $V_2<Vb_1<V_1$. When a single pulse having a sufficiently large amplitude as shown in FIG. 6(a), is applied at the input terminals 25, a superimposed voltage as applied across the diode 10 exceeds its threshold value $V_1$, causing the diode 10 to start oscillation. Since the bias voltage is higher than $V_2$, in this instance, the diode 10 continues oscillating until a negative pulse is applied thereto.

When the bias voltage is above $V_1$, furthermore, a pulse train is obtained with a frequency depending upon the value of the bias voltage. Reference in now made to FIG. 6(b), the magnitude of the bias voltage is sinusoidally changed above the threshold value $V_1$. As shown, the sinusoidal input waveform is modulated into the output pulse train, whose frequency varies with the magnitude of the bias voltage.

Referring now to FIG. 7, there is shown as oscillatory circuit 27 which is triggered by a light signal incident thereon. The oscillatory circuit includes, in a loop 28 substantially similar to the loop 20 of FIG. 5, a photoconductive element 29, the pulse generating diode 10, a load impedance 23 and a DC power source 22. Output terminals 26 are also included in the circuit 27 and connected to the load impedance 23. The photoconductive element 29 has a photoconductive body 30 and a pair of light permeable electrodes 31 in electrical contact with the major surfaces of the body 30.

In operation, the bias voltage to be applied to the diode 10 is assumed to be adjusted in a fashion that its value is slightly lower than the oscillation starting voltage $V_1$. When a light signal $L_1$ having a sufficient intensity is incident on the photoconductive body 30 through the light permeable electrodes 31, the resistivity of the photoconductive element 29 is reduced in accordance with the intensity of the signal $L_1$, with resultant increase of the magnitude of the bias voltage. When the bias voltage exceeds the value $V_1$, the loop 28 of the circuit 27 starts to oscillate to thereby produce a continuous pulse or a pulse train at the output terminals 26, as has been discussed with reference to FIG. 6(a).

Where the initial bias voltage is higher than the value $V_1$, on the other hand, the loop 28 of the circuit 27 is oscillating continuously, say, producing a pulse train. Under this condition, if a light signal $L_1$ irradiates the photoconductive element 29, the frequency of the obtained pulse train is varied depending upon the intenisty of the incident signal $L_1$, as is apparent from FIG. 4.

This light-triggered oscillatory circuit has a modification, which will be described in conjunction with FIG. 8. In this modification, an oscillatory circuit 32 has a compound element 33 in which the pulse generating diode and the photoconductive element are made integral with each other. The compound element 33 is composed of a semiconductive material 34 of N-type, a highly resistive layer 35 of $\nu$ type formed adjacent to one of the two major surfaces thereof, a photoconductive material 36 disposed adjacent to the other of the major surfaces, and a pair of light permeable electrodes 37 mounted respectively in contact with the resistive layer 35 and the photoconductive material 36.

The operation of the modified oscillatory circuit of FIG. 8 is substantially similar to that of FIG. 7 so that the repeated discussion thereof is herein deemed unnecessary.

Turning now to FIG. 9, an electro-optical converter 38 of this invention is shown to be a combination of a photoconductive element with an electroluminescent material. As is apparent from FIG. 9, therefore, there are two loops in the electro-optical converter 38. One loop 40 of oscillation for energizing the electroluminescent material 39 comprises in series a photoconductive element having a photoconductive body 41 and a light permeable electrode 42 mounted at one end of the body 41, a DC power source 43 of variable voltage, a common pulse generating diode 10 and a common permeable electrode 47. The other loop 44 of light emission comprises in series the electroluminescent material 39 having a light permeable electrode 45 at one end, the common pulse generating diode 10 and the common electrode 47.

With oscillation of this loop 40, in operation, the electroluminescent material 39 is excited to luminesce. The frequency of the oscillatory loop changes in accordance with the intensity of the incident light $L_1$. Therefore, the intensity of the light $L_2$ emitted from the electroluminescent material 39 is also variable depending upon that of the light $L_1$. If the electroluminescent material is selected suitably, in this instance, the wavelength of the emitted light $L_2$ may be different from that of the incident light $L_1$. It should be appreciated here that the electro-optical converter 38 can provide optical wavelength conversion with variable intensity by applying a DC voltage thereto.

This invention further proposes an electro-optical device 46 using a plurality of such similar converters. In this device, the three similar converters 38, 38' and 38'' are arranged in cascade and in optically coupling relationship with each other, as shown by way of example in FIG. 10.

When a light signal $L_1$ irradiates the device 46, the first converter 38 emits a light signal $L_2$ which in turn irradiates the second converter 38'. With the light signal $L_2$ being incident on the second converter 38' the second converter 38' emits a light signal $L_3$ which in turn irradiates the third converter 38', with the resultant emission of light signal $L_4$. It should be appreciated that the electro-optical device of the invention comprises electrically isolated and optically coupled electro-optical converters. Consequently, the device finds applications in communications in an electronic computer. If the emission properties of the three converters are different from each other, moreover, the wavelengths of the light signals $L_1$, $L_2$, $L_3$ and $L_4$ may also be varied one by one. With such different emission properties, the device also finds a wide variety of applications in display systems of quick response.

What is claimed is:

1. An oscillatory circuit for producing a pulse signal having a frequency according to a light signal thereto, comprising a pulse generating diode having an N-type semi-conductive wafer sandwitched between two electrodes and including a high resistive layer which is doped with iron, said pulse generating diode commencing to oscillate by itself when a voltage applied thereto exceeds the threshold voltage thereof, a photoconductive element having a photoconductive substrate sandwitched between two light permeable electrodes one of which is connected to one electrode of said diode, a DC power source for producing a DC power having a voltage higher than the threshold voltage of said diode and having one terminal connected to the other electrode of said photoconductive element, and a load impedance having one terminal of said power source and another terminal connected to the other electrode of said diode.

2. An oscillatory circuit according to claim 6, wherein said pulse generating diode and said photoconductive element are made integral with each other to form a compound element.

3. An oscillatory circuit according to claim 2, wherein said compound element is composed of a semiconductive material of N-type, a highly resistive layer of $\nu$-type formed adjacent to one of the two major surfaces thereof, a photoconductive material disposed adjacent to the other of said major surfaces, and a pair of light permeable electrodes mounted respectively in contact with said resistive layer and said photoconductive material.

4. An electro-optical converter comprising a first loop including in series a photoconductive element having a photoconductive body and a light permeable electrode mounted at one end of said body, a DC power source and a pulse generating diode, and a second loop including in series said pulse generating diode as a common element and an electroluminescent material having a light permeable electrode at one end thereof, the other ends of said photoconductive body and said electroluminescent material being in electrical contact with each other, through a light permeable electrode whereby, when the first loop oscillates with an input light signal being incident on said photoconductive body, the second loop is energized to emit an output light signal having an intensity depending upon that of the incident light and upon the bias voltage applied to said pulse generating diode by said DC power source.

5. An electro-optical device comprising a plurality of the electro-optical converters of claim 4 arranged in cascade and in optically coupling relationship with each other.

* * * * *